UNITED STATES PATENT OFFICE.

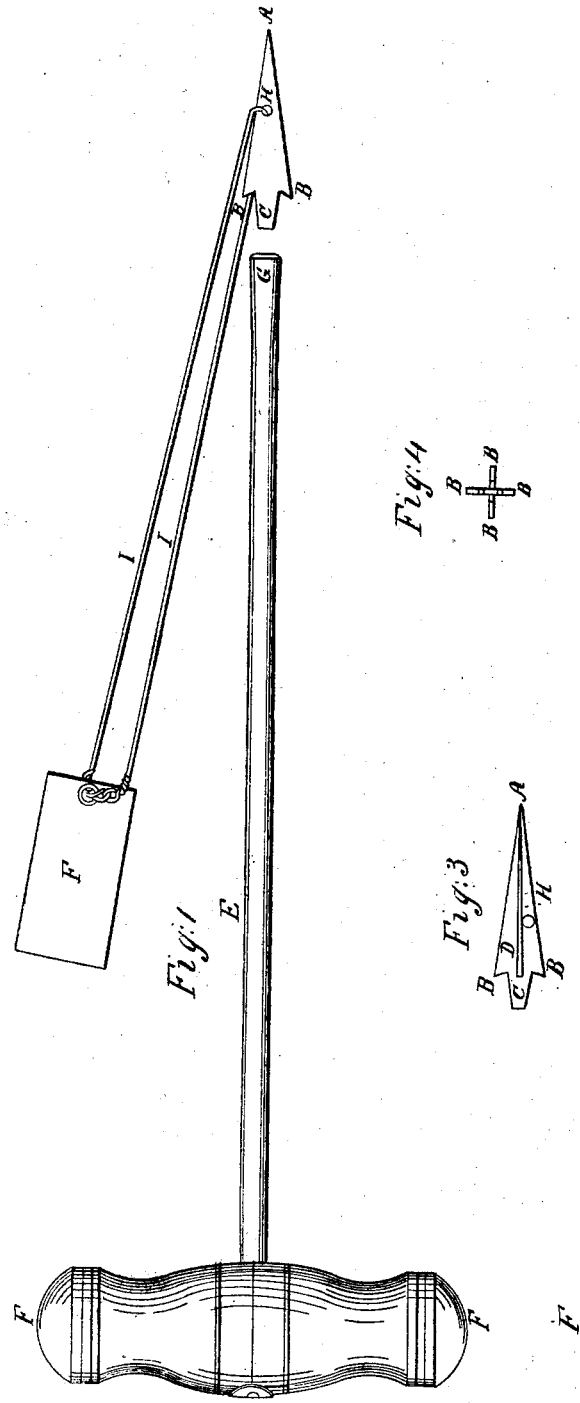
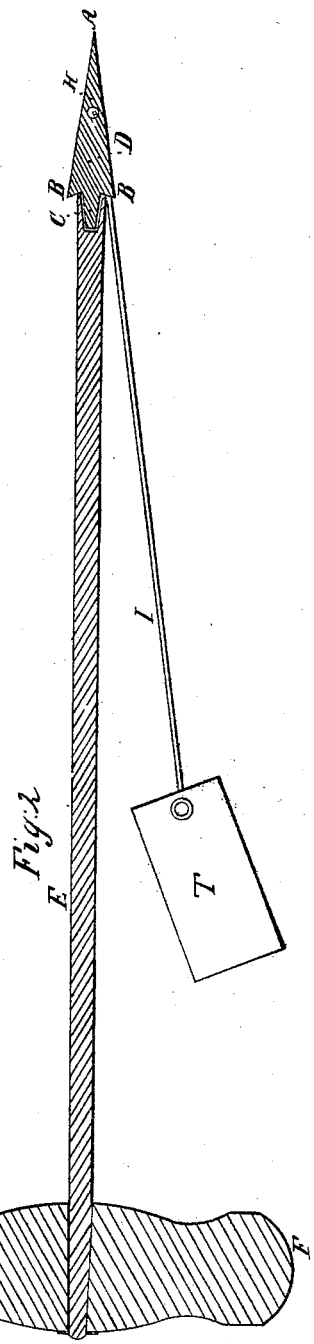
P. Fitch.
Tag Holder.
N° 38,363. Patented Apr. 28, 1863.

PORTER FITCH, OF BROOKLYN, NEW YORK.

IMPROVEMENT IN MARK-HOLDERS FOR BALES, &c.

Specification forming part of Letters Patent No. 38,363, dated April 28, 1863.

*To all whom it may concern:*

Be it known that I, PORTER FITCH, of Brooklyn, in the county of Kings and State of New York, have invented a new and Improved Mode of Attaching Tags to Bales of Merchandise; and I do hereby declare that the following is a full and exact description thereof, reference being had to the accompanying drawings, and to the letters of reference marked thereon.

The difficulty of attaching tags to cotton or other bales of merchandise, to represent the number of pounds, quality, stamp-duty, &c., so as to prevent their easy removal by accident or otherwise, is well known to cotton-dealers.

The object of my invention is to overcome this difficulty to a great extent, and also to facilitate the operation of attaching the tags to the bales.

Figure 1 represents an instrument having a metallic blade, or, as shown in Figs. 3 and 4, a metallic dart, terminating at one end in the sharp point A, and at the other in the barbs B B. on either side of the shank C.

This blade or dart is constructed with two or more cutting-edges extending from the point to the shoulders or barbs, and beveled to any desirable width.

At H is an aperture in the blade, through which passes a wire or chain, I, having the tag T attached to the end farthest from the blade. In connection with this blade is the shaft E, having at one end the arms F F, and in the opposite end the socket G, into which fits accurately the shank C.

This invention enables the tag to be fastened easily and permanently to the bale. The socket G is fitted upon the shank C, as shown in Fig. 2, and the operator, taking hold of the arms F F, thrusts the dart deep into the bale. Upon withdrawing the shaft E the cotton, wool, or other substance in the bale closes together, and the barbs prevent the dart or blade from coming out.

I do not wish to confine myself to the use of the socket and shank as represented, but may reverse them, having the socket in the dart or blade, and the shank forming the end of the shaft E. I may also accomplish the same object by the use of the instrument shown in Fig. 5, in which the blade D is sunk into the side of the blade of the instrument M and there held by a tooth or otherwise in such a manner that while the blade M is being thrust into a bale the blade D will not be detached from its position as shown in the drawings, and that when the blade M is withdrawn from the bale, the blade D will be detached and remain in the bale.

What I claim as new, and desire so secure by Letters Patent, is—

1. The blade D, as shown in Figs. 1 and 2.
2. The dart D, as shown in Figs. 3 and 4.
3. The use of the arms F F in connection with the shaft E, as shown in Figs. 1 and 2.
4. The use of the blade D, the wire or chain I, and the tag T, in combination with the shaft E, substantially as shown in Figs. 1 and 2, all substantially as and for the purpose described.

In witness that I claim the foregoing, I have hereunto set my hand.

PORTER FITCH.

Witnesses:
 D. E. SOMES,
 LYSANDER HILL.